WAVE FOR CORRECTING CIRCUITS

Filed May 5, 1966

INVENTOR
Alfred Brian Edwin Ellis
BY
Baldwin & Wight
ATTORNEYS

United States Patent Office 3,497,817
Patented Feb. 24, 1970

3,497,817

WAVE FORM CORRECTING CIRCUITS

Alfred Brian Edwin Ellis, Essex, England, assignor to The Marconi Company Limited, London, England, a British company Filed May 5, 1966, Ser. No. 547,933
Claims priority, application Great Britain Feb. 25, 1966, 27,721/65
Int. Cl. H03b *1/04*
U.S. Cl. 328—163 8 Claims

ABSTRACT OF THE DISCLOSURE

A wave form correcting circuit which produces a control voltage dependent upon the difference of the time interval between successive transitions of a datum line by one wave form and the time interval between successive transitions of the same datum line by a second wave form of the same frequency is shown. The control voltage is used to shift at least one of the wave forms relatively to said datum line in a direction to annul the difference. The control voltage is obtained from the output of a differential amplifier which has its respective inputs coupled via smoothing circuits to the outputs of respective Schmitt trigger circuits having the one and second wave forms applied to respective inputs thereof.

Figure 1:
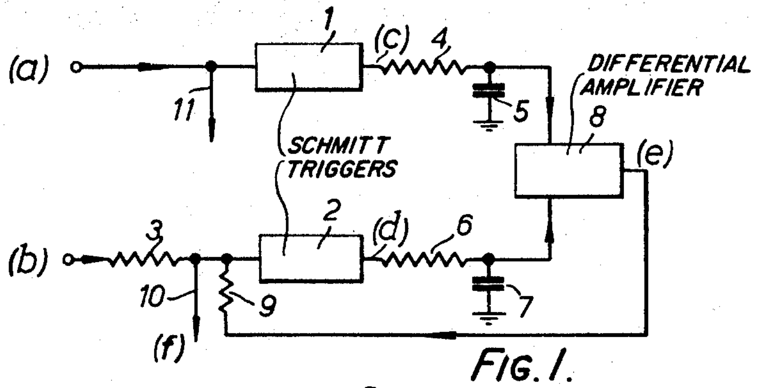

This invention relates to wave form correcting circuits and has for its object to provide improved circuits adapted to apply relative correction to two wave forms of the same frequency in such manner as to permit accurate measurement of their relative phase to be made. For convenience one of these waveforms will be hereinafter termed the "signal" wave form and the other will be hereinafter termed the "reference" wave form.

The customary method of detecting the relative phase between a signal wave form and a reference wave form is to sample each of the two wave forms where they cross a datum voltage line—usually, though not necessarily the zero voltage line—and then measure the phase or time difference between corresponding samples, one from each wave form. So long as neither wave form suffers material distortion in its passage to the point at which sampling is effected or, if distortion does occur, so long as the distortion suffered by both wave forms is, nearly enough, the same, this method involves no difficulties and results in accurate measurement. Commonly, however, serious differential distortion occurs. Thus, for example, the signal wave form may reach the sampling point via a radio propagation channel or a long line or a number of amplifying or signal processing circuits, or a combination of these things, suffering substantial distortion (including noise and other interferences) in consequence, whereas the reference wave form may reach the sampling point from a local source and be substantially free from distortion. In such cases sampling as above described is liable to produce seriously inaccurate measurements because one result of distortion of one wave form is shift the position of the datum voltage line with respect to the distorted wave form above or below the position of the corresponding datum voltage line with respect to the original undisturbed wave form. Accordingly a measurement of the phase or time difference between two samples taken as above described from the signal and reference wave forms will not depend, as is desired, wholly on the relative phase of the two wave forms but is liable to contain an error caused by shift of the datum voltage line due to distortion in one of the wave forms. The present invention seeks to overcome this difficulty.

According to this invention a wave form correcting circuit comprises means for producing a control voltage dependent upon the difference of the time interval between successive transitions of a pre-determined voltage line by one wave form and the time interval between successive transitions of the same voltage line by a second wave form of the same frequency, and means for utilising said control voltage to shift at least one of said wave forms relatively to said voltage line in a direction to annul said difference. In this way the effect of differential distortion as between the two wave forms on the positions, relative thereto, of their original datum lines, is annulled and, after correction by this invention, relative phase measurement by the known method of measurement of the relative phase of samples taken from the wave forms may be effected and will give satisfactory results substantially free from error due to datum line shifting as a result of differential distortion.

Preferably, where one wave form is a reference wave form and the other a signal wave form liable to have suffered distortion, the control voltage is applied to apply correction to said signal wave form only though, theoretically, it may be used to apply correction to either or both the said source forms.

Preferably each wave form is applied to a device adapted to produce therefrom a substantially rectangular voltage wave form which changes from one value to another at each transition of a voltage line in one direction and back again at each transition of said voltage line in the other direction; each of the said substantially rectangular voltage wave forms is smoothed to derive therefrom a D.C. voltage; and the two D.C. voltages are applied to a differential amplifier to produce the control voltage.

In a preferred embodiment each wave form is applied to a Schmitt trigger circuit followed by a smoothing circuit, the output from the two smoothing circuits are applied to a differential amplifier and the output from said amplifier is added as correcting voltage at the input of one Schmitt trigger circuit.

Figure 2:
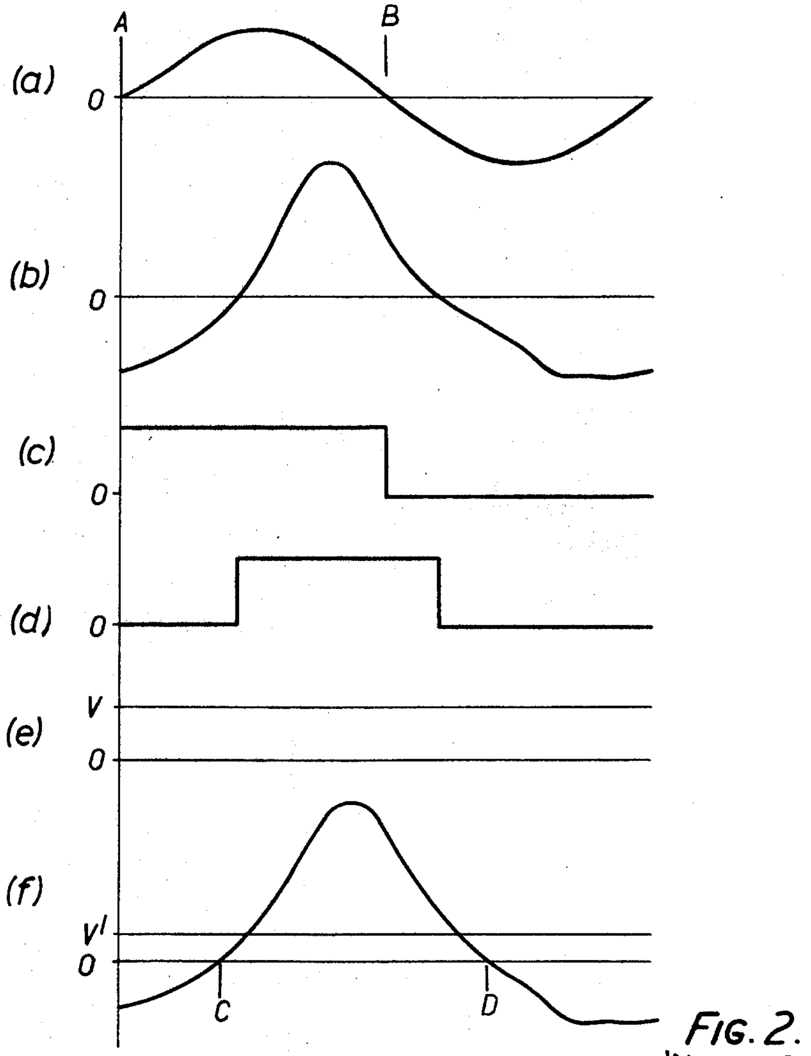

The invention is illustrated in and further explained in connection with the accompanying drawings in which FIGURE 1 is a simplified diagram of one embodiment and FIGURE 2 shows in lines *a* to *f* inclusive, wave forms appearing at the corresponding lettered positions in FIGURE 1.

Referring to the drawings a substantially undistorted wave form (line *a* of FIGURE 2) is applied to a Schmitt trigger circuit 1 and a wave form of the same frequency, which has suffered distortion (line *b* of FIGURE 2) is applied to a similar Schmitt trigger circuit 2 through a resistance 3. Zero voltage datum lines marked 0 are shown in lines *a* and *b* of FIGURE 2. Two successive transitions of the zero voltage datum line are marked A and B in line *a* of FIGURE 2. It will be seen that the times of transition of the zero voltage datum line of the distorted wave form of line *b* of FIGURE 2 are dependent not only on the relative phase of the two wave forms but also on the distorton present in said wave form.

The outputs of the two Schmitt trigger circuits 1 and 2 are shown in lines *c* and *d* respectively of FIGURE 2 and these outputs are smoothed to produce D.C. voltages by means of resistance-capacity smoothing circuits 4, 5 and 6, 7 respectively. The resulting D.C. voltages, which will be different and dependent on the time intervals between successive transitions of the zero voltage datum lines by the two wave forms, are applied to a differential amplifier 8 which produces a D.C. control voltage V (line *e* of FIGURE 2) which is a measure of the difference of the two D.C. voltages. This control voltage is fed back, in negative feed-back sense, through resistance 9 as correcting bias or addition at the input of the Schmitt trigger circuit 2. The result is, as shown by line *f* of FIGURE 2, to correct the effective datum from the line marked V' to the line marked 0 so that the time interval C–D of line *f* is the same as the interval A–B of line *a*. If now the wave form appearing on lead 10 is sampled, when the wave form there crosses the zero voltage line, and is phase compared with samples similarly taken from the reference wave form appearing on lead 11, the result will be a substantially accurate measurement of relative phase substantially free of phase measurement error due to distortion of the signal wave form *b*.

I claim:

1. A wave form correcting circuit comprising a first input means for receiving one wave form which is a reference wave form, a second input means for receiving a second wave form which is a signal wave likely to have been distorted, said first input means being coupled to a means for producing a first D.C. voltage related to the time between successive transitions of said one wave form of a predetermined voltage line, said second input means being coupled to a means for producing a second D.C. voltage related to the time between successive transitions of said second wave form of said predetermined voltage line, means for producing said control voltage from said first D.C. voltage and said second D.C. voltage, and wherein said means for utilizing said control voltage is a means for coupling said control voltage to said second input means for shifting the D.C. level of said second input means.

2. A wave form correcting circuit as claimed in claim 1 wherein said one wave form is a sinusoidal wave form.

3. A wave form correcting circuit as claimed in claim 2 wherein said one wave form has a given frequency and said second wave form has a frequency identical to said given frequency.

4. A wave form correcting circuit as claimed in claim 1 wherein said means for producing said control voltage comprises a differential amplifier.

5. A wave form correcting circuit as claimed in claim 1 wherein said means for producing said control voltage comprises a differential amplifier having a first input coupled to receive said first D.C. voltage, and a second input coupled to receive said second D.C. voltage, an output of said differential amplifier being coupled to said second input means.

6. A wave form correcting circuit as claimed in claim 1 wherein said means for producing a first D.C. voltage comprises a device for producing a first substantially rectangular voltage wave form which changes from one value to another at each transition of said one wave form of said voltage line, and means for smoothing said first substantially rectangular voltage wave form, and wherein said means for producing a second D.C. voltage comprises a device for producing a second substantially rectangular voltage wave form which changes from one value to another at each transition of said second wave form of said voltage line, and means for smoothing said second substantially rectangular wave form.

7. A wave form correcting circuit as claimed in claim 6 wherein said means for producing said control voltage comprises a differential amplifier having a first input coupled to receive said first D.C. voltage, and a second input coupled to receive said second D.C. voltage, an output of said differential amplifier being coupled to said second input means.

8. A wave form correcting circuit as claimed in claim 6 wherein said device for producing a first substantially rectangular voltage wave form comprises a first Schmitt trigger circuit and said device for producing a second substantially rectangular voltage wave form comprises a second Schmitt trigger circuit.

References Cited

UNITED STATES PATENTS 2,963,648 12/1960 Baskin et al.
3,005,165 10/1961 Lenigan.

DONALD D. FORRER, Primary Examiner

DAVID M. CARTER, Assistant Examiner

U.S. Cl. X.R.

307—235, 268; 328—147